(12) United States Patent
Fischer et al.

(10) Patent No.: US 7,925,968 B2
(45) Date of Patent: Apr. 12, 2011

(54) PROVIDING NAVIGATION FROM CONTENT TO A PORTAL PAGE

(75) Inventors: Ilja Fischer, Heidelberg (DE); Juergen Schmerder, Wlesloch (DE)

(73) Assignee: SAP AG, Walldorf (DE)

( * ) Notice: Subject to any disclaimer, the term of this patent is extended or adjusted under 35 U.S.C. 154(b) by 1127 days.

(21) Appl. No.: 11/287,595

(22) Filed: Nov. 28, 2005

(65) Prior Publication Data

US 2007/0124663 A1 May 31, 2007

(51) Int. Cl.
- G06F 17/00 (2006.01)
- G06F 17/20 (2006.01)
- G06F 17/21 (2006.01)
- G06F 17/22 (2006.01)
- G06F 17/24 (2006.01)
- G06F 17/25 (2006.01)
- G06F 17/26 (2006.01)
- G06F 17/27 (2006.01)
- G06F 17/28 (2006.01)

(52) U.S. Cl. ...... 715/205; 715/234; 715/208; 707/999.2

(58) Field of Classification Search .................. 715/234, 715/205; 707/200, 999.2

See application file for complete search history.

(56) References Cited

U.S. PATENT DOCUMENTS

| | | | |
|---|---|---|---|
| 6,049,799 A * | 4/2000 | Mangat et al. | 707/10 |
| 6,424,979 B1 | 7/2002 | Livingston | |
| 7,158,971 B1 * | 1/2007 | Bascom | 707/10 |
| 7,500,181 B2 * | 3/2009 | Kim et al. | 715/234 |
| 7,512,900 B2 * | 3/2009 | Lynch et al. | 715/825 |
| 2002/0198859 A1 * | 12/2002 | Singer et al. | 707/1 |
| 2003/0237044 A1 | 12/2003 | Hayer | |
| 2004/0205473 A1 * | 10/2004 | Fisher et al. | 715/500 |
| 2005/0197852 A1 * | 9/2005 | Gebhard et al. | 705/1 |
| 2005/0223310 A1 * | 10/2005 | Wachholz-Prill et al. | 715/501.1 |
| 2007/0113191 A1 * | 5/2007 | Keller et al. | 715/752 |

OTHER PUBLICATIONS

Huges, Gareth and Carr, Leslie, Microsoft Smart Tags: Support, Ignore or condemn them?, HT'02, Jun. 11-15, 2002 Copyright 2002 ACM, p. 80-81.*

Huges, Gareth and Carr, Leslie, Microsoft Smart Tags: Support Ignore or Condem them?, HT'02, Jun. 11-15, 2002 Copyright 2002 ACM, p. 80-81.*

'Object-based Navigation: An Intuitive Navigation Style for Content-oriented Integration Environment' [online]. Citeseer, 1997, [retrieved on Nov. 28, 2005]. Retrieved from the Internet: URL:http://citeseer.ist.psu.edu/cache/papers/cs/11155/http:zSzzSzjournals.ecs.soton.ac.ukzSz~laczSzht97zSzpdfszSzhirata.pdf/hirata97objectbased.pdf.

(Continued)

Primary Examiner — Stephen S. Hong
Assistant Examiner — Nicholas R Hasty
(74) Attorney, Agent, or Firm — Mintz, Levin, Cohn, Ferris, Glovsky and Popeo, P.C.

(57) ABSTRACT

Navigation from content to a portal page is provided by identifying a name of a first object in content to be displayed in a computer system. A first portal page is configured to present information about the first object. Metadata of a kind that, when received by the portal, causes the first portal page to be displayed, is obtained. An input control associated with the name of the first object is created in the content, the metadata to be forwarded to the portal upon a user activating the input control. A GUI comprises a portal area for displaying a first portal page associated with a first object upon the portal receiving metadata for the first object, and a content presentation area including an input control that is associated with a name of the first object. Upon a user activating the input control the metadata is forwarded to the portal.

15 Claims, 7 Drawing Sheets

OTHER PUBLICATIONS

'Description of ActiveDocs 2002' [online]. Keylogix Limited, 2002, [retrieved on Jun. 27, 2005]. Retrieved from the Internet: URL:http://www.keylogix.com/support/kb/000092.asp.

'Smart Tags' [online]. TechTarget, 1999-2005, [retrieved on Jun. 27, 2005]. Retrieved from the Internet: <URL: http://searchwin2000.techtarget.com/sDefinition/0,,sid1_gci755198,00.html>.

'Object-Based Navigation' [online]. SAP, publication date unavailable, [retrieved on Jun. 27, 2005]. Retrieved from the Internet: <URL: http://help.sap.com/saphelp_nw04/ehlpdata/en/3e/...>.

'Object-Based Navigation Editor' [online]. SAP, publication date unavailable, [retrieved on Jun. 27, 2005]. Retrieved from the Internet: <URL: http://help.sap.com/saphelp_nw04/helpdata/...>.

'Metadata for Digital Libraries: a Research Agenda' [online]. EU-NSF Working Group on Metadata, publication date unavailable, [retrieved on Jun. 27, 2005]. Retrieved from the Internet: <URL: http://www.ercim.org/publications/ws-proceedings/EU-NSF/metadata.html>.

'Content-Based Multimedia Information Handling: Should we Stick to Metadata?' [online]. Cultivate Interactive, 2000-2001, [retrieved on Jun. 27, 2005]. Retrieved from the Internet: <URL: http://www.cultivate-int.org/issue6/retrieval/>.

'WD2002: Dotted Lines That Appear Under Dates, Names, and Places Are Smart Tag Indicators That Can Save You Time' [online]. Microsoft Corporation, 2005, [retrieved on Jul. 28, 2005]. Retrieved from the Internet: <URL: http://support.microsoft.com/kb/q284927/>.

'Use of Portal Navigation' [online]. SAP, publication date unavailable, [retrieved on Oct. 13, 2005]. Retrieved from the Internet: <URL: http://help.sap.com/saphelp_nw04/helpdata/en/b5/...>.

* cited by examiner

PROVIDING NAVIGATION FROM CONTENT TO A PORTAL PAGE

TECHNICAL FIELD

The description relates to providing portal navigation from content to a page.

BACKGROUND

Computer systems typically make large amounts of information available to their users. Various approaches have also been used in aiding the users in accessing the pieces of information. A common way of making information available is to present a representation thereof on a display device. The information representation may automatically appear upon the user initiating the system, or the user may cause it to be presented by querying the system for information, to name just two examples.

Many systems also provide functions that allow a user to cause the presentation of one information representation to follow immediately upon the presentation of another information representation—that is, to navigate from one representation to another. Sometimes this navigation is provided by hyperlinking, wherein the address of the second representation is stored so that when the user clicks on the link, the address is used for locating the other information representation so that it can be displayed.

However, using the explicit address of the other representation may limit the flexibility of the system. For example, if the address is expected to change over time the link may become useless unless it is updated with the new information. Another example is that the address may not be known at a time when it is desirable to create the navigation function.

For these and other reasons, other approaches to navigation have been suggested. For example, products from SAP AG in Walldorf (Baden), Germany, have introduced a portal that, among other features, can provide navigation to an object using the object type and an object identifier. This solution is sometimes referred to as object-based navigation and provides that the link to the object need not specify the exact location of the object; rather, the object type and identifier are sufficient for the portal to locate the object such that its representation can be displayed. Nevertheless, it may be a cumbersome procedure to create the link and to determine what information the portal will need for the navigation and where to obtain that information when the link is being created.

SUMMARY

The invention relates to providing navigation from content to a page.

In a first general aspect, the invention comprises a computer program product tangibly embodied in an information carrier. The computer program product includes instructions that, when executed, cause a processor to perform operations for providing navigation from content to a portal page. The operations comprise identifying a name of a first object in content to be displayed in a computer system. The first object is stored in a repository. The computer system includes a portal and a first portal page is configured to present information about the first object. The operations comprise obtaining, from the repository, metadata associated with the first object. The metadata is of a kind that, when received by the portal, causes the first portal page to be displayed. The operations comprise creating, in the content, an input control that is associated with the name of the first object. The metadata is to be forwarded to the portal upon a user activating the input control.

Embodiments may include any or all of the following features. A second portal page may comprise the content, and the second portal page may be configured to present information about a second object stored in the repository. Obtaining the metadata may further comprise determining whether an association between the first object and the second object has previously been defined. When the association exists, the association may be selected as the metadata. The association may be evaluated at runtime to determine whether the association is valid. The association may be evaluated using data replicated from the repository to the portal. A document may comprise the content. Identifying the name may further comprise presenting to the user a command relating to the first object, and activation of the command by the user may trigger the obtaining of the metadata and the creation of the input control. The name may be placed in the document through an automatically executed process. The document may be a word processing document. The metadata may comprise a type of the first object and an identifier of the first object. The input control may comprise a link that the user can activate to cause the first portal page to be displayed, the link comprising the name of the first object. Creating the input control may further comprise storing the metadata in the content in association with the link, the metadata not being visible to the user. The link may further have associated therewith an address of the portal for forwarding the metadata.

In a second general aspect, the invention comprises a computer program product tangibly embodied in an information carrier. The computer program product comprises instructions that, when executed, generate on a display device a graphical user interface (GUI) for providing navigation from content to a portal page. The GUI comprises a portal area generated by a portal, wherein the portal area displays a first portal page associated with a first object stored in a repository upon the portal receiving metadata for the first object. The GUI comprises a content presentation area including an input control that is associated with a name of the first object. Upon a user activating the input control the metadata is forwarded to the portal, the metadata having been obtained from the repository upon identifying the name of the first object.

Embodiments may include any or all of the following features. The GUI may initially display the content presentation area and not the portal area, and the GUI may display the portal area upon the user activating the input control. The input control may comprise a link that the user can activate to cause the first portal page to be displayed, the link comprising the name of the first object. The content presentation area may be included in the portal area, and the input control may be included in a second portal page displayed in the portal area. The metadata may be stored in association with the input control, and the metadata may not be visible to the user. The second portal page may be associated with a second object stored in the repository, and the metadata may comprise an association that has previously been defined between the first object and the second object.

Advantages of the systems and techniques described herein may include any or all of the following: Providing creation of navigation from content to a portal page. Providing that a navigational link to a portal page for an object is automatically created upon detecting the name of the object in content. Providing that metadata useful for portal navigation to a page is automatically retrieved upon detecting a name associated with the metadata.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
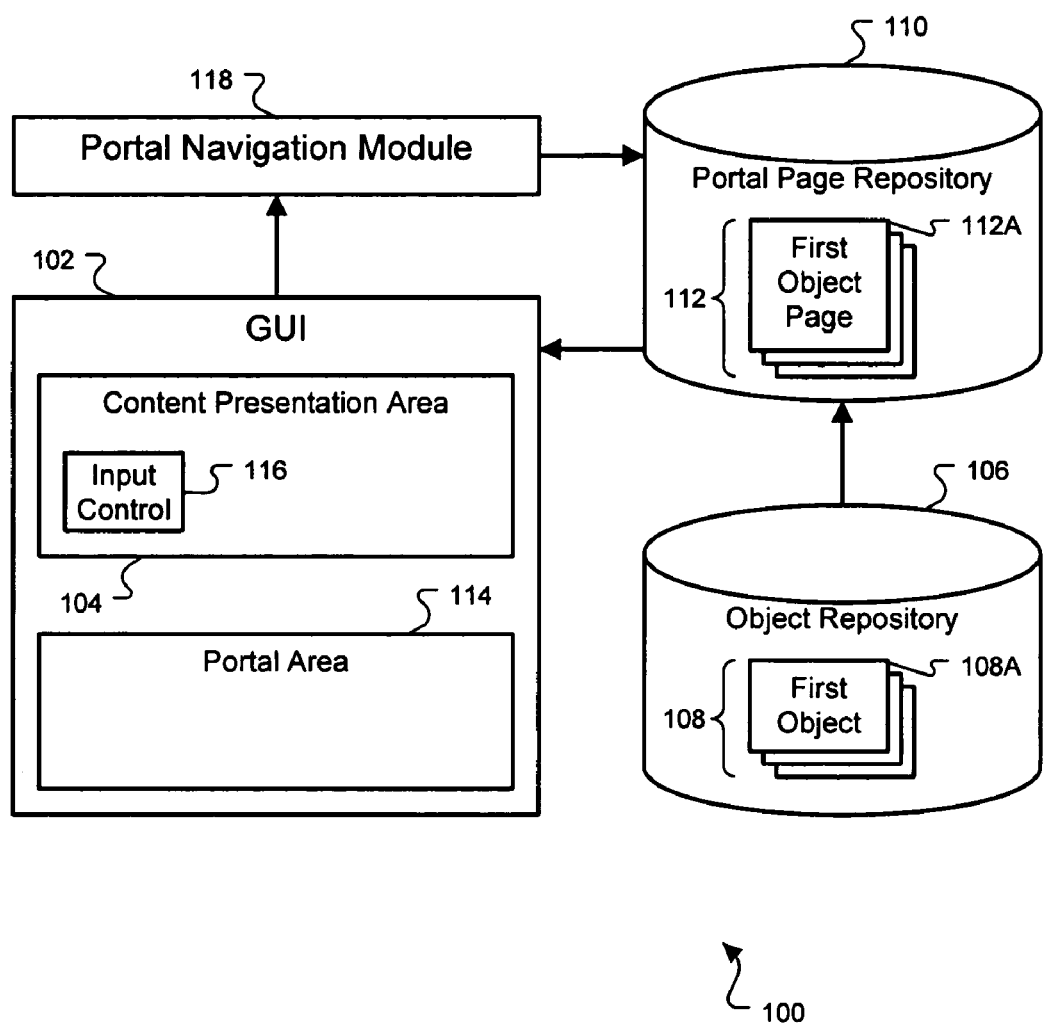
FIG. 1 is a block diagram of a computer system that provides navigation from content to a portal page.

FIG. 1 shows a computer system 100 that provides navigation from content to a portal page within a portal. The system can identify, in content that is to be displayed, the name of an existing object. Upon identifying the name, the system can obtain metadata associated with the object from a repository. The metadata is of the kind that, when received by the portal, causes a portal page configured to present information about the object to be displayed. The system can create an input control that is associated with the object name. Upon a user activating the input control, the metadata is forwarded to the portal. Thus, the system can parse content, such as text entered by a user, to see if it contains a name of an object that can be visualized through a portal page. If so, the system can obtain metadata for the object from a repository—which metadata is to be used for portal navigation—and use it in creating an input control for navigating to the portal page for the object.

A graphical user interface (GUI) 102 comprises a content presentation area 104. In one implementation, a document, such as a word processing document, comprises the content such that the content is presented upon displaying the word processing document. In another implementation, a portal page comprises the content such that the content is presented upon displaying the portal page. For example, the content may be business data in a Microsoft Word document or in a portal page of a customer relationship management (CRM) application.

An object repository 106 stores objects 108 and, in particular, a first object 108A. The objects 108 may represent instances of products, sales documents, business representatives, trading partners, customers, vendors and other entities with which a business relationship exists or could be established. A portal page repository 110 stores portal pages 112. A portal area 114 within the GUI 102 is configured to display any or all of the portal pages 112. In particular, the portal area 114 may display a first object page 112A, which presents information about the first object 108A. The repositories 106 and 110 may be separate (as shown) or combined. In some systems, either or both of the repositories are implemented using an Enterprise Service Repository (ESR) that is available in products from SAP AG in Walldorf (Baden), Germany.

The content presentation area 104 includes an input control 116 associated with the name of the first object 108A. The input control 116 is created upon the system 100 identifying the name of the first object 108A in the content. Particularly, the metadata for the first object 108A is obtained from the object repository 106 and used in creating the input control 116. For example, the input control 116 may be a link that comprises the name of the first object 108A, wherein the metadata is stored in association with the link for forwarding to the portal upon the input control 116 being activated. A user may activate the input control 116 to view information about the first object 108A. This causes the metadata to be forwarded to a portal navigation module 118. When the portal navigation module 118 receives the metadata, it causes the first object page 112A to be displayed within the portal area 114.

FIGS. 2A-D show another example of a system that provides navigation from content to a portal page within a portal. Here, the content is included in a document 202, such as a word processing document. The document 202 may be displayed at a front end system 204. The document 202 may display a name 206. For example, the name 206 is "Mueller," which is the name of a business partner. The system identifies the name 206 as being the name of an existing object, here the first object 108A. Upon identifying the name, the system presents the user with a command 208. The command 208 may be a dialog that presents a question to the user, such as, "Do you want a link to the corresponding portal page?" In some implementations, the system may underline or otherwise highlight the name 206 upon identifying it, and the command 208 may be presented in a menu displayed in the GUI 102. For example, the function of identifying the name 206 may be implemented by adapting the SMART TAG technology available from Microsoft Corp. The system is configured so that upon the user activating the SMART TAG command, the metadata associated with the object at issue is automatically obtained from the object repository 106 and used in creating the input control.

If the user activates the command 208, such as by affirming the question presented, the system obtains metadata corresponding to the first object 108A from the repository 106 and creates the input control. The repository 106 may be located in a backend system 210.

In some implementations, an automatically executed process may place the name 206 in the document 202. For example, a batch process running in the backend system 210 automatically generates the document 202 according to predefined instructions. Upon the system detecting the name in the generated document, the metadata is retrieved and used in generating the input control. The generated document 202 will include the name of the first object 108A, the metadata associated with the first object 108A, and the input control associated with the metadata.

Figure 2A:
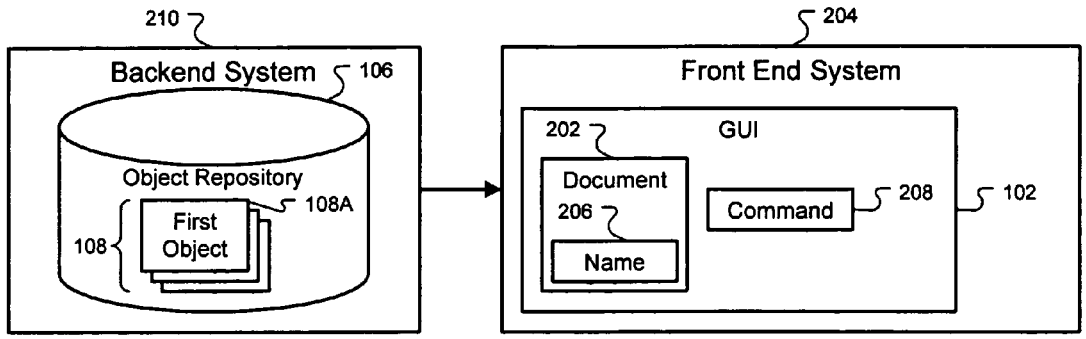
FIGS. 2A-D are block diagrams of a system that provides navigation from content in a document to a portal page.
Figure 2B:
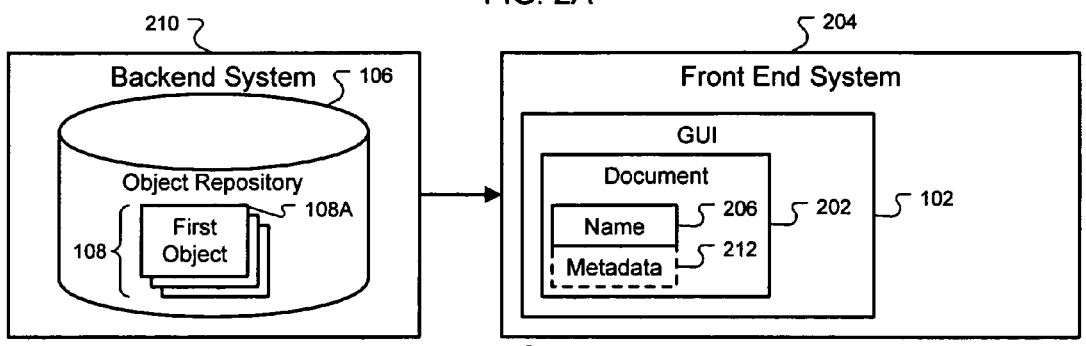

FIG. 2B shows the system of FIG. 2A after metadata 212 associated with the first object 108A has been added to the document 202. The metadata 212 may be invisible to the user and is therefore schematically illustrated with a dashed outline. In some implementations, the metadata 212 contains a type and an identifier of the first object 108A. For example, the type may specify that the first object 108A is a product as opposed to, say, a corporate entity or a contact and the identifier may specify an individual instance of the product. The object type and the identifier in this example are of the kind that, when received by the portal, causes the system to display the portal page that presents information about the product object.

Figure 2C:
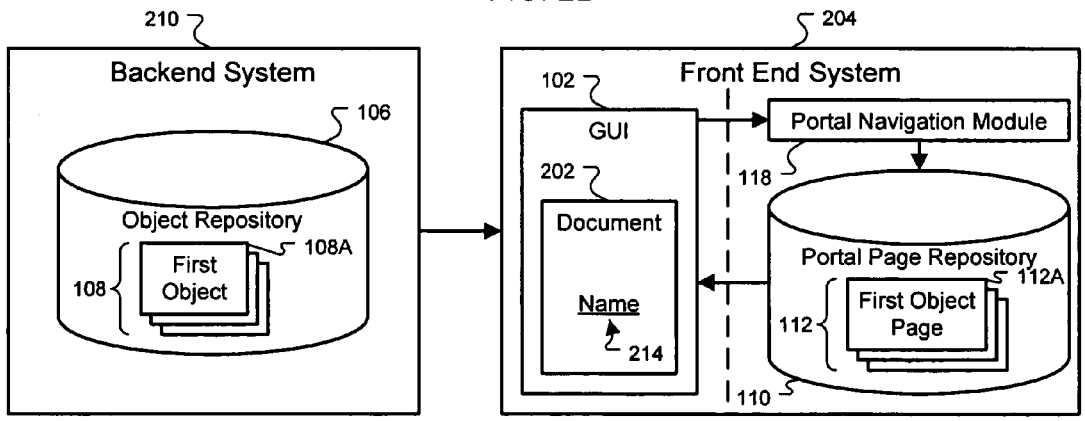

FIG. 2C shows the system of FIG. 2A after an input control 214 associated with the name 206 of the first object 108A has been added to the document 202. The user may activate the input control 214 to forward the metadata 212 to the portal navigation module 118. The portal navigation module 118 uses the metadata 212 to determine that the first object page 112A should be displayed.

In the implementation of FIG. 2C, the input control 214 is a link including the name 206 of the first object 108A. Here, the metadata 212 is stored in association with the link and the metadata 212 is not visible to the user. For example, the link may have associated therewith an address of the portal navigation module 118 that allows the metadata 212 to be forwarded to the portal navigation module 118. That is, upon the user activating the link 214, the metadata 212 is forwarded to the portal navigation module 118 using its address. In some implementations, the user's role in the system is forwarded to the portal navigation module 118 with the metadata and used in determining how to display the portal page to the user; e.g., which portion or aspect of the page to display.

Figure 2D:
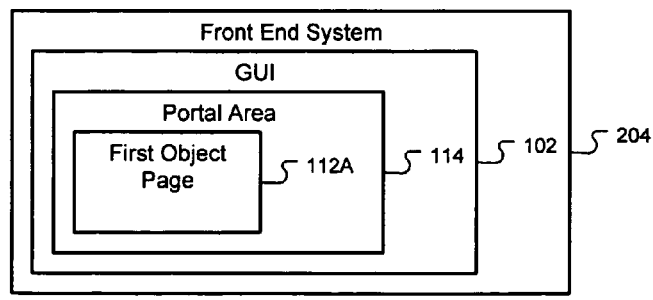

FIG. 2D shows the front end system 204 of FIGS. 2A-C after the user selects the input control 214. After receiving the metadata 212, the portal navigation module 118 generates or updates the portal area 114 to display the first object page 112A that is configured to present information about the first object 108A. The portal navigation module 118 retrieves the first object page 112A from the portal page repository 110. Thus, upon detecting the name 206 in the document 202, the system retrieves the metadata 212 and generates the input control 214 that the user can activate to have the portal page 112A displayed.

Figure 3A:
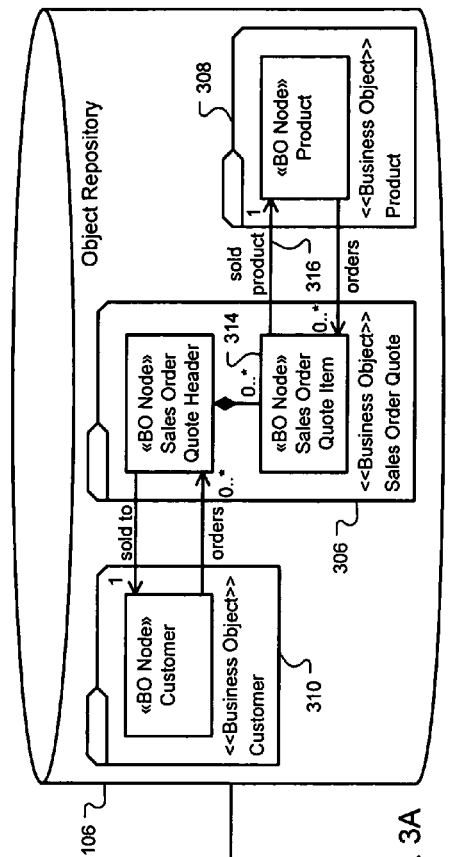
FIGS. 3A-B and D are block diagrams of a system that provides navigation from content in a first portal page to a second portal page.

FIG. 3A shows another example of a system that provides navigation from content to a portal page within a portal 302. The navigation is from a product name listed in a sales order quote to a page for the listed product. Here, the content is information about an instance of a first object, presented in a first portal page named Sales Order Quote Page (SOQ page) 304. The SOQ page 304 presents information about an instance of a Sales Order Quote Business Object (SOQ object) 306 stored in the object repository 106. A Product Business Object (P object) 308 and a Customer Business Object 310 are also stored in the object repository 106. A Heating Coils Page (HC page) 312 is configured to present information about an instance of the P object 308. Objects within the object repository 106 may have associations between them. For example, a Sales Order Quote Item (SOQ item) 314 within the SOQ object 306 is associated with one P object representing the sold product, as represented by the arrow 316. Here, the SOQ item 314 corresponds to a heating coil product that is included in the sales order quote. As another example, the SOQ object 306 is associated with the Customer object 310 to indicate that the sales order quote is issued to a particular customer. The specific sales order quotes, products or customers represented in the system are created as instances of the corresponding object 306, 308 or 310. Moreover, an existing association between the objects may be used in creating a user-selectable navigation link between such instances, as will be described.

The portal 302 is configured to detect whether any object name is listed in the sales order quote page, because the occurrence of an object name can be used to trigger the creation of a navigation to the corresponding portal page, as indicated by the dashed arrow 318. The portal 302 determines if an association has been defined between, on one hand, a first object whose information is presented in a first portal page and, on the other hand, a second object whose name appears in the first portal page. For example, a name of the P object 308, such as "Heating Coils," may appear in the SOQ page 304 (see FIG. 3C), and the portal 302 may determine if an association exists between the SOQ object 306 and the P object 308.

Figure 3B:
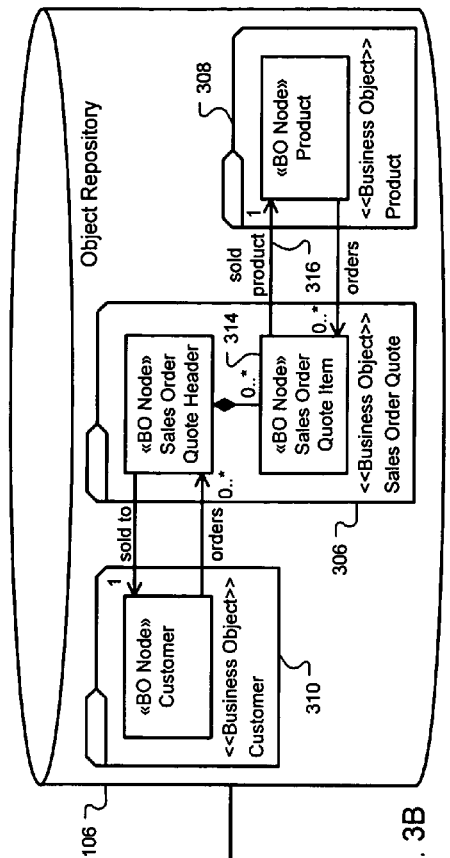

FIG. 3B shows an association 320 comprising the metadata associated with the P object 308. The association 320 corresponds to the association 316 between the SOQ object 306 and the P object 308. When the portal 302 receives the association metadata 320 it causes the HC page 312 to be displayed. Thus, the inclusion of the association 320 provides that a user can navigate from the listing of the heating coil product in the sales order quote to the corresponding product page, as represented by the arrow 318 being shown in solid form.

Figures 3C, 3D:
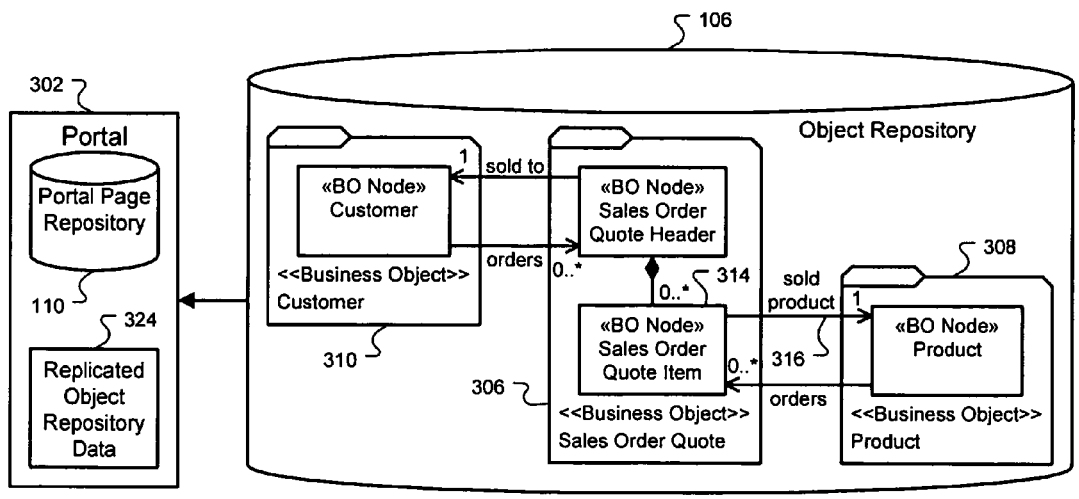
FIG. 3C is a representation of the first portal page of the system shown in FIG. 3A.

FIG. 3C shows the Sales Order Quote Page 304. The SOQ page 304 includes a header area 321A with information about the sales order quote, a body area 321B with information about the product(s) covered by the sales order quote, and an operations area 321C for the user to initiate operations regarding the sales order quote. The SOQ page 304 includes at least one input control 322 in the body area 321B for linking to one of the products listed there. Here, the input control 322 is a link comprising the name "Heating Coils" of the instance of the P object 308. If the user activates the input control 322, the association metadata 320 is forwarded to the portal 302 causing the HC page 312 to be displayed.

In some implementations, the association between the first object and the second object is evaluated at runtime. For example, upon the user triggering the SOQ page 304 to be displayed, the portal 302 identifies the name of the P object 308 within the SOQ page 304. The portal 302 then determines if an association exists between the SOQ object 306 and the P object 308. The portal 302 finds the association 314 and selects the association 320 as the metadata.

For example, FIG. 3D shows an implementation where replicated object repository data 324 is available in the portal 302. The replicated data is used to determine if an association exists between the first object and the second object and whether an existing association is valid. For example, at runtime the portal 302 may determine from the replicated object repository data 324 that the association 316 exists between the SOQ object 306 and the P object 308.

Figure 4:
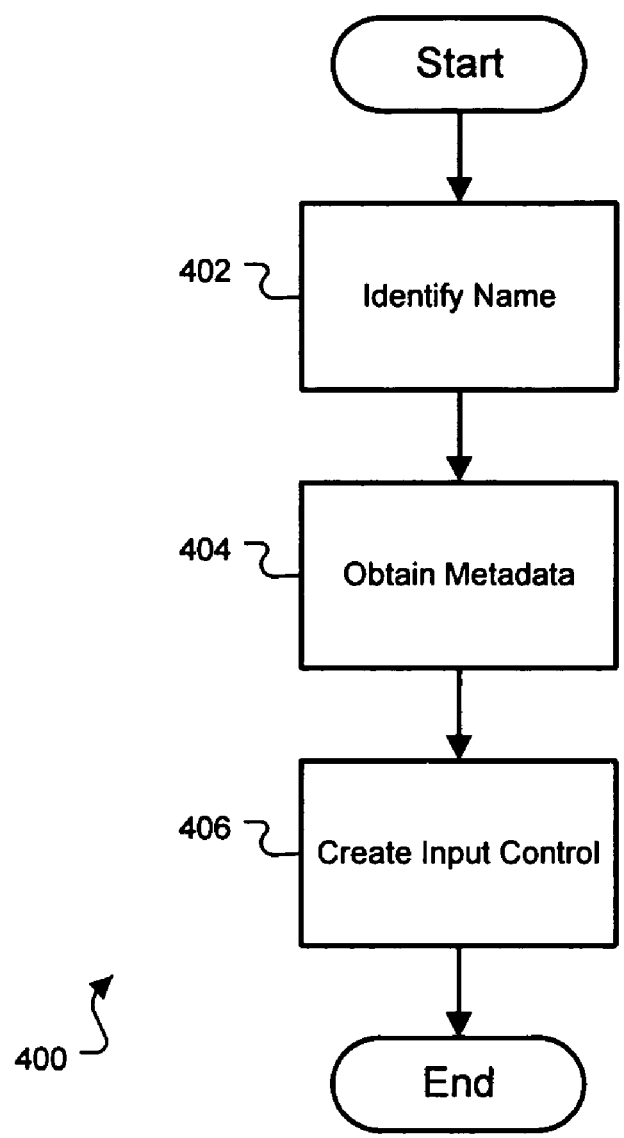
FIG. 4 is a flow chart of exemplary operations that can be performed to provide navigation from content to a portal page at design time.

FIG. 4 is a flow chart of exemplary operations 400 relating to providing navigation from content to a portal page. For example, the operations 400 can be performed in the computer system 100. A processor executing instructions stored in a computer program product can perform the operations 400. The operations 400 begin in step 402 with identifying a name of a first object in content to be displayed in a computer system. The first object is stored in a repository. In addition, the computer system includes a portal wherein a first portal page is configured to present information about the first object. For example, referring to FIGS. 2A-D, the name 206 of the first object 108A in the repository 106 is identified in the document 202. The identification may take place upon a user typing the name into a document, or upon the system scanning the contents of a document generated in an automated batch process, to name two examples. The repository may be an ESR, to name one example.

In step 404, metadata associated with the first object is obtained from the repository. The metadata is of a kind that causes the first portal page to be displayed when the metadata is received by the portal. For example, the metadata 212 associated with the first object 108A is obtained from the repository 106. The metadata 212 may include the type and the identifier of the first object 108A. The type may specify that the first object 108A is a product as opposed to a corporate entity or a contact and the identifier may specify an individual instance of the product. The type and the identifier cause the first object page 112A to be displayed when received by the portal navigation module 118.

In step 406, an input control associated with the name of the first object is created in the content. The metadata is to be forwarded to the portal upon a user activating the input control. For example, the input control 214 associated with the name of the first object 108A is created in the document 202. The metadata 212 associated with the name 206 is forwarded to the portal navigation module 118 upon the user activating the input control 214.

The following is a brief example based on the operations 400 described above. A user is typing text into an electronic document that is currently presented on a display device. An object name is identified in the typed text in step 402. The object exists in a repository and can be visually presented using a particular portal page. To create a user-selectable navigation control to the object, there is obtained, in step 404, metadata from a repository and this metadata is used in creating the control in step 406. If a user selects the created input control, the obtained metadata will be forwarded to the portal in connection with a request to have the associated portal page displayed.

Figure 5:
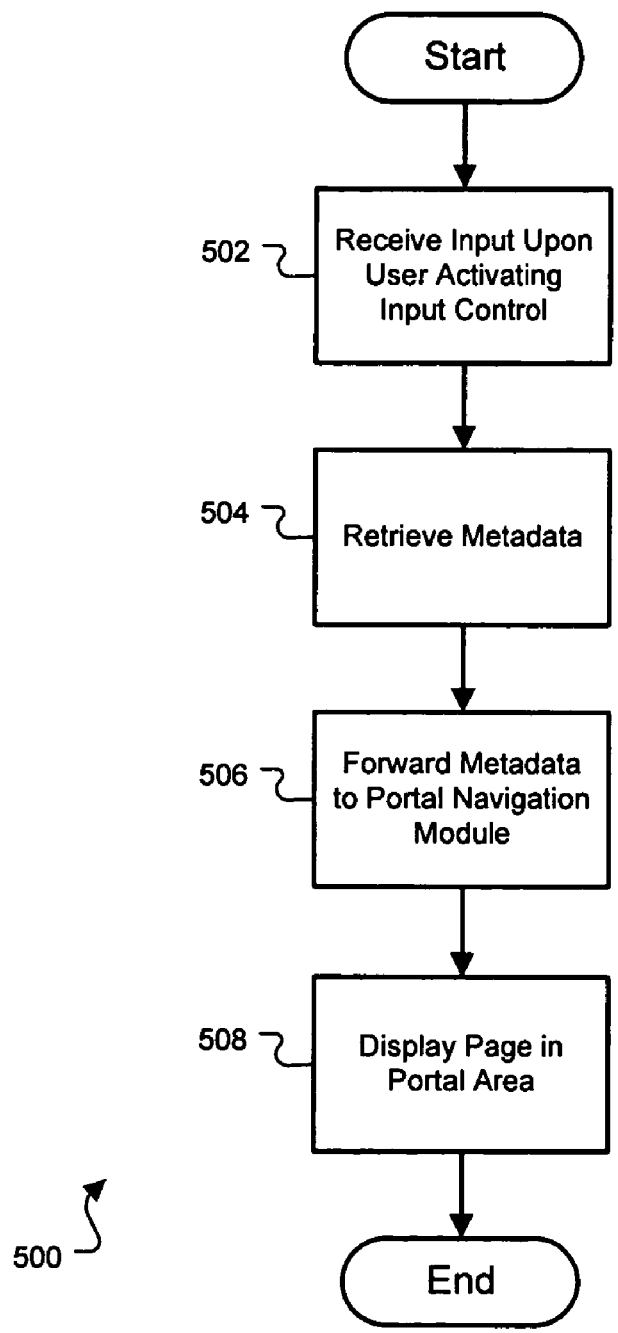
FIG. 5 is a flow chart of exemplary operations that can be performed to provide navigation from content to a portal page at runtime.

FIG. 5 is a flow chart of exemplary operations 500 relating to providing navigation from content to a portal page. For example, the operations 500 can be performed in the computer system 100. A processor executing instructions stored in a computer program product can perform the operations 500. The operations 500 begin in step 502 with receiving an input upon a user activating an input control. For example, referring to FIGS. 3A-D, the portal 302 receives an input made by the user with the input control 322. The input control 322 is displayed on the SOQ page 304 and comprises the name of the SOQ item 314.

In step 504, metadata associated with the input control is retrieved. For example, the SOQ item 314 is associated with the P object 308. This association may be stored as the metadata 320 in the portal page repository 110. The portal 302 retrieves the metadata 320 associated with the SOQ item 314 shown on the SOQ page 304.

In step 506, the metadata is forwarded to a portal navigation module. For example, the metadata 320 including the association between the SOQ item 314 and the P object 308 is forwarded to the portal navigation module 118. An address of the portal navigation module 118 may be associated with the input control 322 for forwarding the metadata 320 to the portal navigation module 118.

In step 508, a portal page is displayed in a portal area. For example, the HC page 312 is configured to display information about the P object 308. Upon the portal navigation module 118 receiving the metadata 320 associated with the P object 308, the HC page 312 is displayed in the portal area 114.

Figure 6:
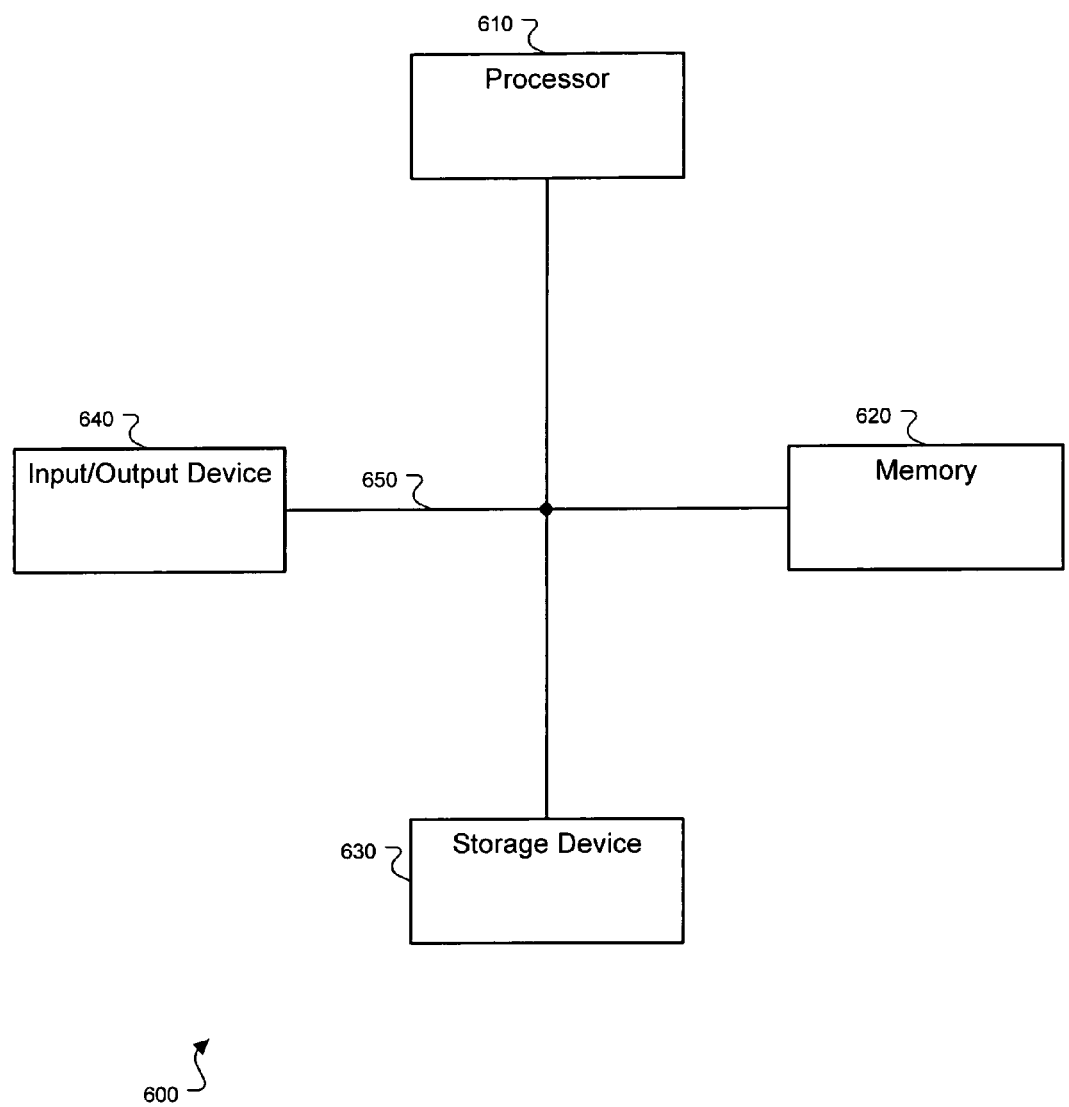
FIG. 6 is a block diagram of a general computer system.

FIG. 6 is a block diagram of a computer system 600 that can be used in the operations described above, according to one embodiment. For example, the system 600 may be included in either or all of the computer system 100, the backend system 210, the front end system 204, and the portal 302.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a storage medium, the computer program product including instructions that, when executed, cause a processor to perform operations for providing navigation from content to a portal page, the operations comprising:
    identifying a name of a first object in content to be displayed in a computer system, the first object being stored in a repository, wherein the computer system includes a portal and wherein a first portal page is configured to present information about the first object;
    obtaining, from the repository, metadata associated with the first object, the metadata comprising a type of the first object and an identifier of the first object, the metadata being of a kind that, when received by the portal, causes the first portal page to be displayed; and
    creating, in the content, an input control that is associated with the name of the first object, wherein the metadata is to be forwarded to the portal upon a user activating the input control;
    wherein identifying the name further comprises presenting to the user a command relating to the first object, and wherein activation of the command by the uses triggers the obtaining of the metadata from the repository and the creation of the input control;
    wherein a second portal page comprises the content, the second portal page being configured to present information about a second object stored in the repository;
    wherein obtaining the metadata further comprises determining whether an association between the first object and the second object has previously been defined;
    wherein the association exists, and wherein the association is selected as the metadata.

2. The computer program product of claim 1, wherein the association is to be evaluated at runtime to determine whether the association is valid.

3. The computer program product of claim 2, wherein the association is to be evaluated using data replicated from the repository to the portal.

4. The computer program product of claim 1, wherein a document comprises the content.

5. The computer program product of claim 4, wherein the name is placed in the document through an automatically executed process.

6. The computer program product of claim 4, wherein the document is a word processing document.

7. The computer program product of claim 1, wherein the input control comprises a link that the user can activate to cause the first portal page to be displayed, the link comprising the name of the first object.

8. The computer program product of claim 7, wherein creating the input control further comprises storing the metadata in the content in association with the link, and wherein the metadata is not visible to the user.

9. A computer program product tangibly embodied in a storage medium, the computer program product comprising instructions that, when executed, generate on a display device a graphical user interface (GUI) for providing navigation from content to a portal page, the GUI comprising:
    a portal area generated by a portal providing object-based navigation, wherein the portal area displays a first portal page associated with a first object stored in an object repository upon the portal receiving metadata for the first object, the metadata comprising a type of the first object and an identifier of the first object; and
    a content presentation area including an input control that is associated with a name of the first object, wherein upon a user activating the input control the metadata is forwarded by a portal navigation module to the portal resulting in an object page corresponding to the first object to be retrieved from a portal page repository and displayed in the content presentation area, the metadata having been obtained from the repository upon identifying the name of the first object, wherein the portal page repository is separate from the object repository;
    wherein a second portal page comprises the content, the second portal page being configured to present information about a second object stored in the repository;
    wherein obtaining the metadata further comprises determining whether an association between the first object and the second object has previously been defined;
    wherein the association exists, and wherein the association is selected as the metadata.

10. The computer program product of claim 9, wherein the GUI initially displays the content presentation area and not the portal area, and wherein the GUI displays the portal area upon the user activating the input control.

11. The computer program product of claim 9, wherein the input control comprises a link that the user can activate to cause the first portal page to be displayed, the link comprising the name of the first object.

12. The computer program product of claim 9, wherein the content presentation area is included in the portal area, and wherein the input control is included in a second portal page displayed in the portal area.

13. The computer program product of claim 12, wherein the metadata is stored in association with the input control, and wherein the metadata is not visible to the user.

14. The computer program product of claim 13, wherein the second portal page is associated with a second object stored in the repository, and wherein the metadata comprises an association that has previously been defined between the first object and the second object.

15. A computer program product tangibly embodied in a non-transitory storage medium, the computer program product comprising instructions that, when executed, performs operations comprising:
- initiating generation of a plurality of documents in a batch process in a back-end system;
- determining, for each document, whether names corresponding to objects stored in an repository are present within the document, the object repository forming part of the back-end system;
- retrieving, for each name corresponding to an object present within the document, metadata corresponding to each object from the object repository; and
- completing generation of each of the plurality of documents such that each generated document includes the name of the present objects, metadata associated with the present objects, comprising a type of the present object and an identifier of the present object, and at least one input control associated with the metadata, the input control, when activated by a user, causes the corresponding metadata to be forwarded to a portal navigation module in a front-end system providing object-based navigation in a portal so that the portal navigation module can use the forwarded metadata to determine that an object page in a portal page repository that corresponds to the metadata should be displayed on the front-end system, wherein the front-end system is different and remote from the back-end system, wherein the object repository and the portal page repository both form part of the back-end system;
- wherein a second portal page comprises the document, the second portal page being configured to present information about a second object stored in the repository;
- wherein obtaining the metadata further comprises determining whether an association between the first object and the second object has previously been defined;
- wherein the association exists, and wherein the association is selected as the metadata.

\* \* \* \* \*